T. A. KLENKE.
CUSHIONING DEVICE FOR VEHICLES.
APPLICATION FILED NOV. 27, 1906.
1,028,740.
Patented June 4, 1912.
5 SHEETS—SHEET 1.
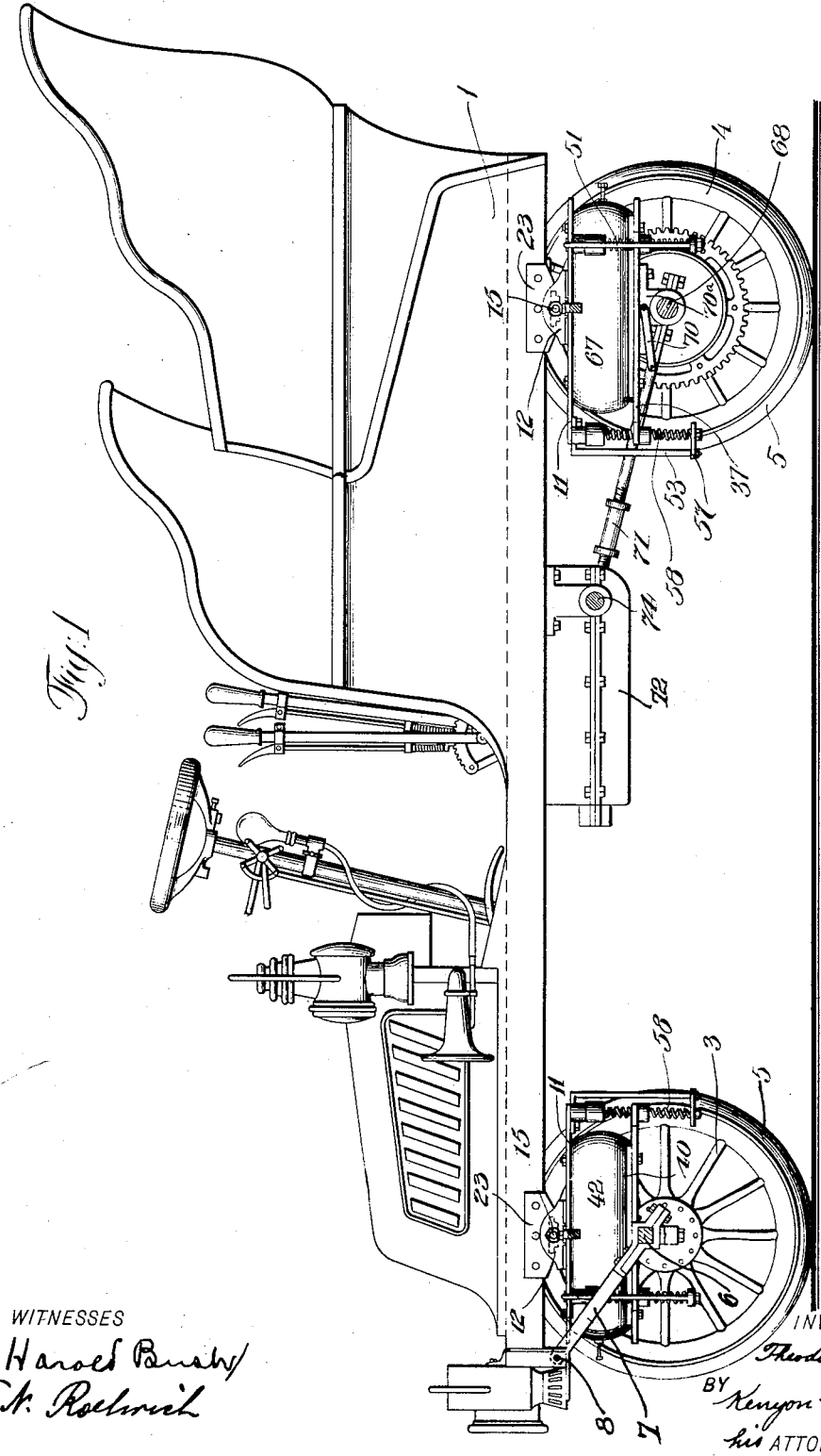
WITNESSES
D. Harold Bush
F. N. Roehrich
INVENTOR
Theodore A. Klenke,
BY Kenyon & Kenyon
his ATTORNEYS.

T. A. KLENKE.
CUSHIONING DEVICE FOR VEHICLES.
APPLICATION FILED NOV. 27, 1906.
1,028,740.
Patented June 4, 1912.
5 SHEETS—SHEET 2.
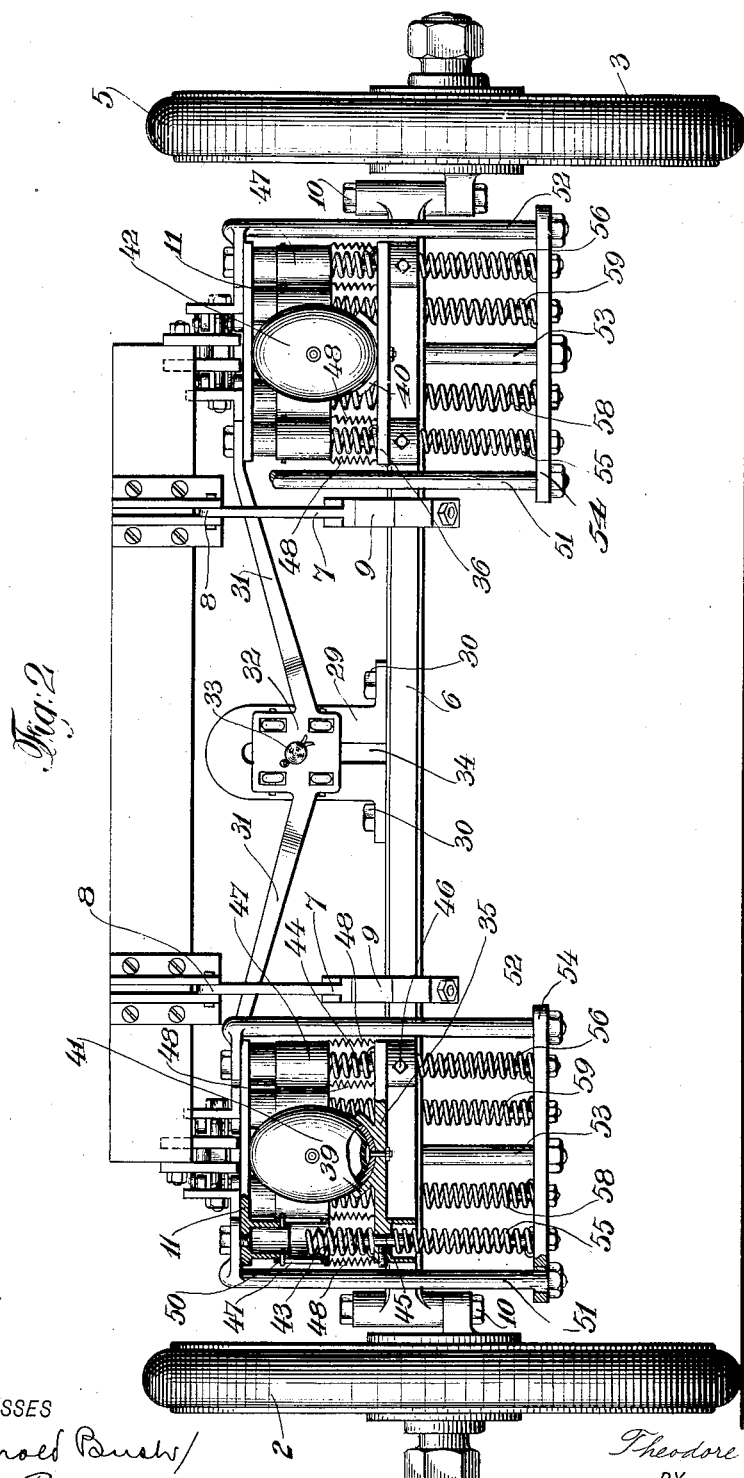
WITNESSES
D. Harold Bush
F. N. Roehrich
INVENTOR
Theodore A. Klenke,
BY
Kenyon & Kenyon,
his ATTORNEYS.

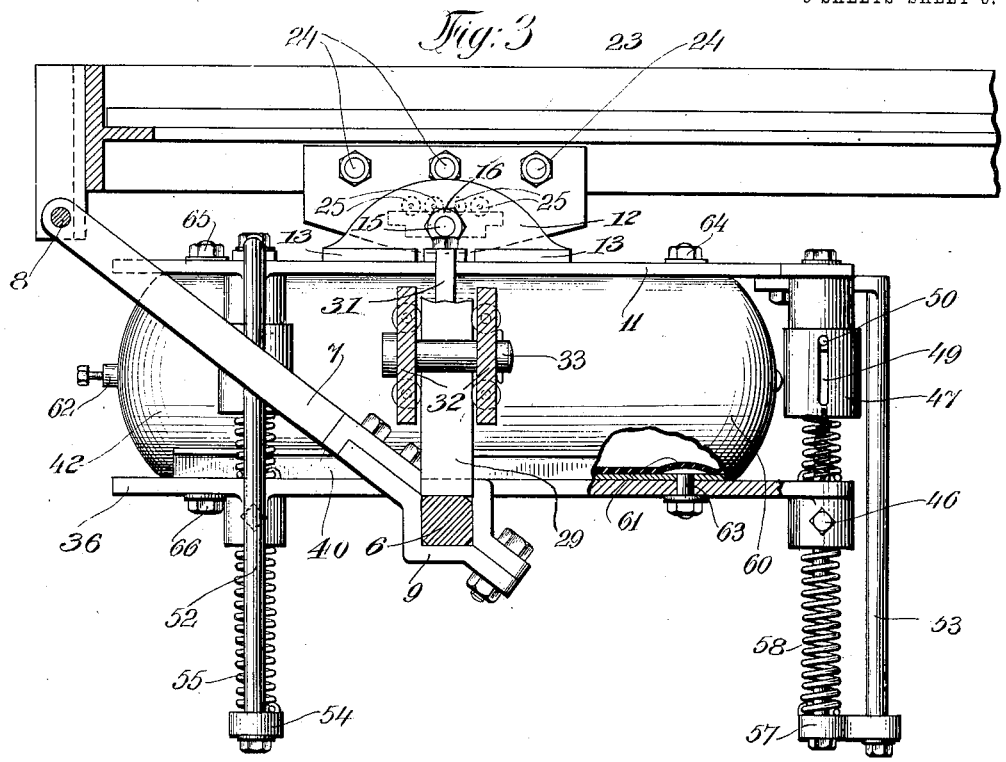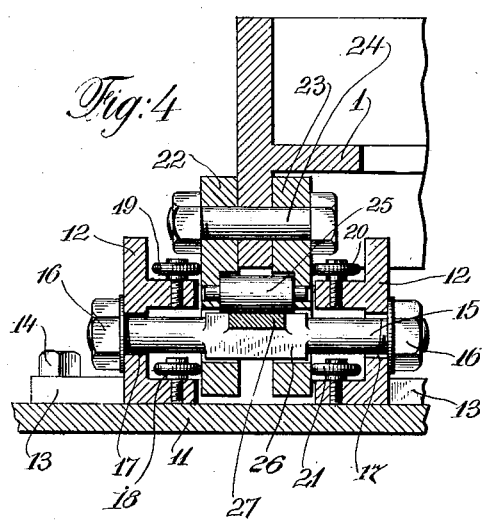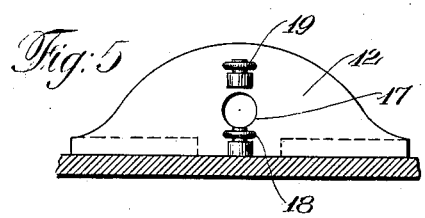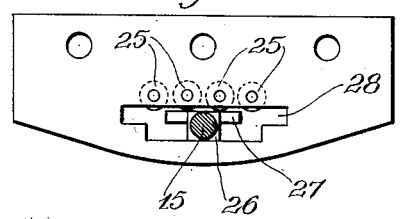

T. A. KLENKE.
CUSHIONING DEVICE FOR VEHICLES.
APPLICATION FILED NOV. 27, 1906.
1,028,740.
Patented June 4, 1912.
5 SHEETS—SHEET 4.
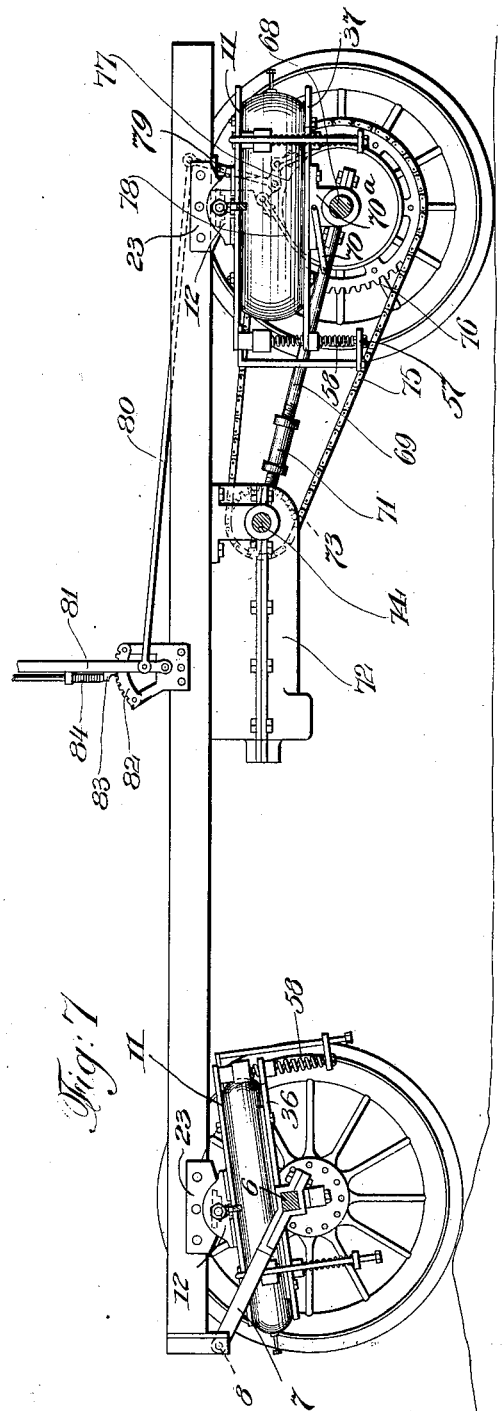
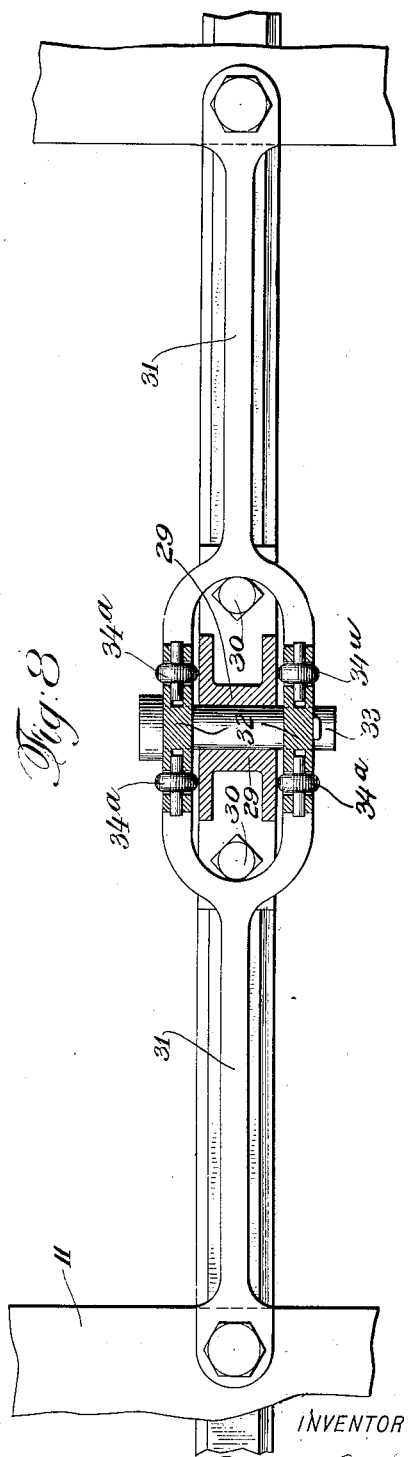
WITNESSES
INVENTOR
Theodore A. Klenke
BY Kenyon & Kenyon
his ATTORNEYS.

T. A. KLENKE.
CUSHIONING DEVICE FOR VEHICLES.
APPLICATION FILED NOV. 27, 1906.
1,028,740.
Patented June 4, 1912.
5 SHEETS—SHEET 5.
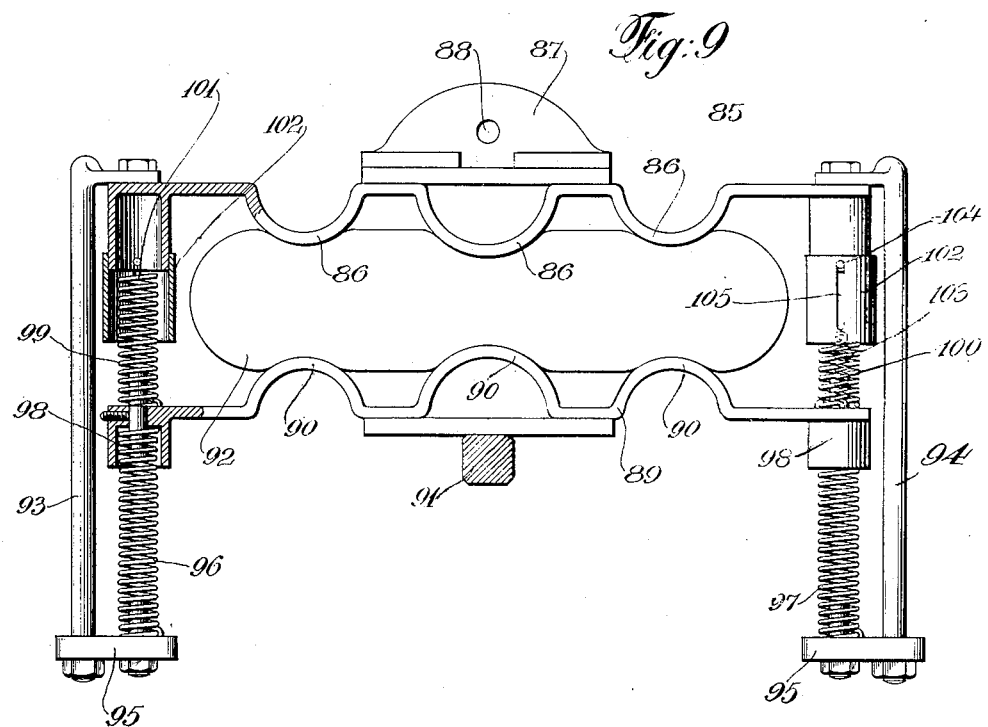
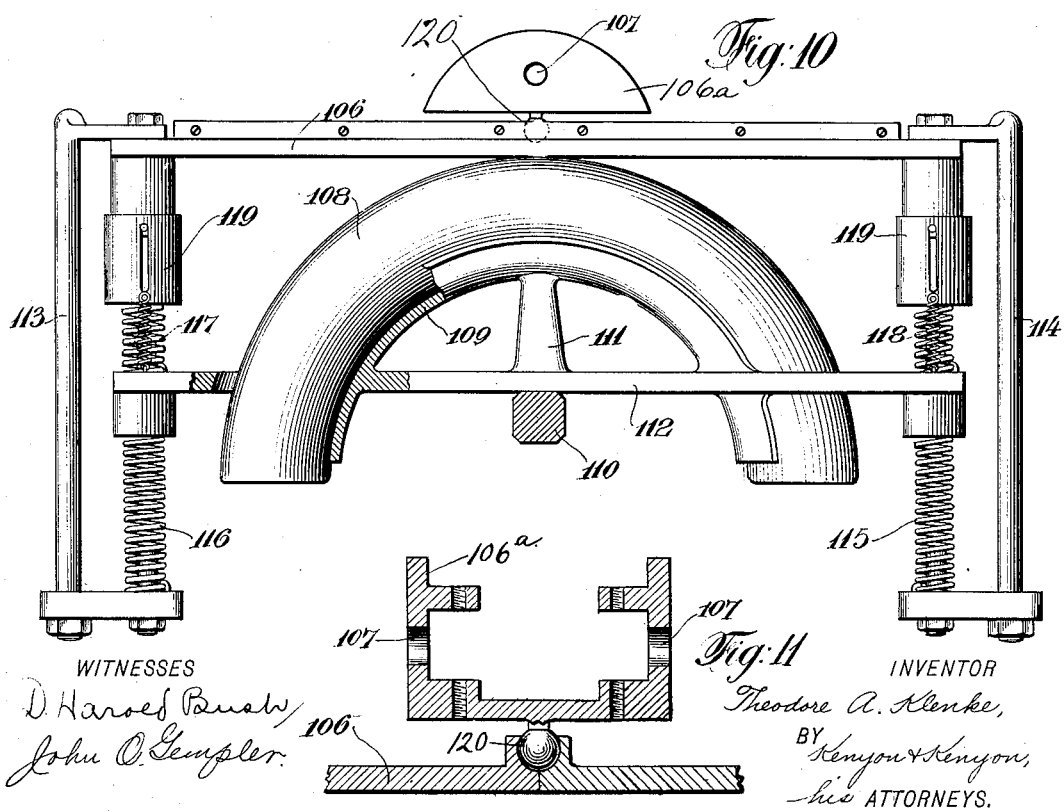
WITNESSES
D. Harold Bush,
John O. Gempler.
INVENTOR
Theodore A. Klenke,
BY Kenyon & Kenyon,
his ATTORNEYS.

UNITED STATES PATENT OFFICE.

THEODORE A. KLENKE, OF NEW YORK, N. Y., ASSIGNOR TO KLENKE CUSHION AXLE COMPANY, A CORPORATION OF NEW YORK.

CUSHIONING DEVICE FOR VEHICLES.

1,028,740.   Specification of Letters Patent.   Patented June 4, 1912.

Application filed November 27, 1906. Serial No. 345,389.

*To all whom it may concern:*

Be it known that I, THEODORE A. KLENKE, a citizen of the United States, a resident of New York, county of New York, and State of New York, have invented a Cushioning Device for Vehicles, of which the following is a specification.

My invention relates to vehicles, and especially to the connections between the wheel or the axle and the bed of the vehicle, and to cushioning devices adapted for use with such connections.

It is shown in drawings accompanying this specification in connection with the axle and bed and running gear of an automobile, but it is not limited to that class of vehicles but may be used with any vehicle to which it is adapted.

My invention has for its object to improve and perfect the connections between the wheel or the axle and the bed of the vehicle, to reduce the effect upon the bed of the shocks and jars transmitted through the axles from the wheels, to make the bed of the vehicle ride more evenly and smoothly, to give greater flexibility to the connections between the wheel or the axle and the bed, to enable resilient means or cushioning devices to be used effectively between the wheels or the axle and the bed, to enable certain classes of vehicles, such as automobiles, to dispense with pneumatic tires, and generally to improve the running gear of vehicles.

One of the objects of my invention is to provide a cushioning device that includes a pneumatic cushion, so arranged that the shocks transmitted to the vehicle from the road-bed, are largely absorbed by the cushion before reaching the bed of the vehicle, the cushion being arranged to carry the load of the vehicle and to be subjected to uniform pressure at substantially all times.

Other specific objects will be pointed out later on in the specification.

With the above and other objects in view my invention consists in the improvements, parts and combinations more fully pointed out in the claims.

In the drawings accompanying this specification and forming part hereof, I have shown my invention, in a preferred form, as applied to an automobile, although it is not limited to use in such a class of vehicles, and I will now proceed to describe that preferred form.

Referring now to the drawings which are attached to this specification and form a part thereof—Figure 1 illustrates a horizontal elevation of a bed of a vehicle mounted on my cushioning device. Fig. 2 illustrates a front elevation of a part of the body and the running gear. Fig. 3 is a detail view partly in section of the cushioning means. Fig. 4 is a detail sectional view illustrating the means for mounting the pivoted pressure transmitting plate that is secured to the body of the vehicle. Fig. 5 is a detail view of a part of the mounting of the plate. Fig. 6 is a detail showing means whereby the pivot of the plate is permitted to have a bodily movement with relation to the bed. Fig. 7 illustrates the operation of cushioning the bed when the front wheel goes over an obstruction. Fig. 8 is a detail of the means for transmitting the movement of the axle to the pressure plates. Fig. 9 illustrates a separate embodiment of my invention. Figs. 10 and 11 illustrate a further embodiment thereof.

The bed of the vehicle is indicated by the reference numeral 1, and is mounted to run upon the usual front or steering wheels 2, 3 and the back wheels 4. The wheels are provided preferably with solid rubber tires 5. The front wheels 2, 3 are mounted on a bodily movable shaft 6, the axle being mounted in swinging arms 7 which are pivoted at 8 in the body of the vehicle. The axle is arranged to swing with the arms 7 without rotating with relation to them. The axle 6 is shown as squared and is embraced by squared arms 9. The axle is thus movably mounted with reference to the bed longitudinally, or in the direction of the length of the vehicle, vertically and also rotatably on its axis. The vertical movement is imparted to some extent to the bed through connections, including a cushioning device or resilient means, as will be presently described. The front steering wheels 2 and 3 are connected in the usual manner to the axle 6 by means of pivot bolts 10.

A pressure transmitting member 11 which, in the embodiment of the invention illustrated upon the drawings, consists of a plate, is movably or yieldingly mounted with relation to the bed 1. In the best embodiment of the invention the plate is pivoted and means are provided for permitting a bodily movement of the pivot with relation to the bed. The preferred means for securing this result is illustrated in Figs. 3 to 6. The plate 11 is provided with standards 12, which are secured to the plate by means of flanges 13 and bolts 14. A pivot pin 15 passes through the standards 12, the pin being retained in place by suitable means, such as the nuts 16, which engage with the screw-threaded ends of the pivot. The plate 11, with standards 12, swings about the pivot pin 15 and bearing surfaces 17 are provided to permit free movement of the plate 11 with relation to the pin. In order to permit the plate and standards to oscillate freely, I prefer to provide anti-friction rollers 18, 19, 20 and 21, which are suitably mounted and which, when the standards 12 oscillate, bear against the fixed portion of the frame attached to the bed of the vehicle.

The means for permitting a bodily movement between the pivot pin and the bed of the vehicle may be widely varied. In the embodiment of the invention illustrated upon the drawings, I secure to the bed 1, suitable plates 22 and 23, by means of bolts 24. In the best embodiment of the invention, I provide anti-friction means, such as rollers 25, which are mounted in the plates 22 and 23 and receive the thrust of the pivot pin 15 as the pin travels back and forth. In the embodiment of the invention illustrated upon the drawings, the pivot pin 15 is provided with a squared portion 26, and wings 27, so that the pin may travel back and forth in the ways 28, without rotating.
Suitable means are provided whereby the bodily movement of the axle produces a corresponding movement of the plate. As the axle 6 rocks about the pivots 8, the plate 11 is caused to rock correspondingly; and as the axle 6, by reason of its bodily movement about the center 8, also moves fore and aft with relation to the carriage bed, the plate 11 is given a corresponding movement. The means for accomplishing this result may be widely varied. In the best embodiment of the invention illustrated upon the drawings, I provide an arm 29, bolted to the axle 6 by the bolts 30, and communicate the movement of the arm 29 to the plate 11 by a suitable connection. The form of this connection may be widely varied. As illustrated upon the drawings, a sliding connection is provided between the arm 29 and the plate 11, the connecting rod 31 being provided with cheek pieces 32 that embrace the arm 29. A roller 33 is mounted in the arm 31 so as to travel in the ways 34, on the arm 29, as the axle 6 moves toward and from the bed plate. Anti-friction rollers 34$^a$ may be used to take up friction. As illustrated upon the drawings, I provide a plurality of upper plates like plate 11, and I preferably provide four, one in connection with each point of support of the bed of the vehicle These plates are numbered 11 and 11, respectively. By these means all of the motions of the axle and its plate, except the vertical motion, are imparted to upper plate 11, thus causing that plate to move with the axle as a unit, and this causes the lower and upper plates to always maintain a parallel position with reference to each other. I also prefer to rigidly connect the upper plate 11 on one side of the vehicle, with the corresponding upper plate 11 on the other side of the vehicle, to cause them to rock and move longitudinally and also vertically together, although this is not essential. In the device shown I accomplish this by making the connecting rods 31 integral. It will be noted that the connections 31, 29, between the axle and the upper plates and the connection of the latter with the bed, prevent lateral movement of the axle and bed relatively to each other.

The resilient means or cushioning devices employed by me between the wheel or axle and the bed are pneumatic bags. In the drawings these are shown as inserted between the pressure-transmitting members or plates carried by the axle and pivoted to the bed respectively. Plates, such as shown in the drawings, which always maintain their parallelism with relation to each other are peculiarly well fitted for use with pneumatic cushions.

Suitable means are provided for supporting a plurality of pneumatic cushions over their axles, so as to take up the shock. In the embodiment of the invention illustrated upon the drawings, I provide plates 35 and 36 which are rigidly secured to the front axle 6. Corresponding plates 37 are secured to the rear axle. The plate 35 is preferably provided with curved portions 39 to form a seat for the pneumatic cushion. Corresponding curved portions 40 are provided for the plate 36. It will be understood, of course, that the axle itself, if desired, may form the lower support for the pneumatic cushions or other resilient means, in which case it should be suitably shaped for the purpose, or that any projection from the axle or part connected to it may form such support. The lower supports for the pneumatic cushions or other resilient means are preferably made rigid with the axle.

From the construction so far described, it will be observed that when the front wheel meet an obstruction, the axle 6 will be given a bodily movement, swinging about the center 8, and the plates 35 and 36 will swing so as to tilt the cushions 41 and 42, at the same time tilting the plates 11 and 11, through the arm 29 and connecting rod 31. In this way each pair of upper and lower plates, as for example plate 11 and plate 36, are kept parallel and the cushion subjected to uniform pressure, instead of squeezing one end of the cushion more than the other end.

Suitable means are provided whereby should the cushions 41, 42 become deflated by a puncture or other cause, the bed of the vehicle will rest upon springs. As illustrated upon the drawings, I provide coil spiral springs 43, 44 in connection with the cushion 41, the lower portions of the springs being guided by pins 45, secured by bolts 46. The upper portions of the springs are preferably guided by the telescoping sleeves 47, which are supported by spiral springs 48. The sleeves are provided with slots 49, which engage with pins 50 (see Fig. 3) so as to guide the sleeves.

Suitable means are provided whereby as the bed of the carriage rebounds and moves away from the road bed, the movement is cushioned. This means is combined with the means heretofore described for taking up the shock between the bed and the axle as follows. I provide plate 11 with rods 51 and 52 at the front of the plate, and with a rod 53 at the rear of the plate. Cross-piece 54 connects the rods 51 and 52, and springs 55 and 56 arranged between the cross-piece 54 and the lower plate, as for example plate 35, take up the shock, as the plates 11 rise with the bed.

It will be observed that the rods 51 and 52 are separated from each other, so that the pneumatic cushion 41 may be removed for repairs. I prefer to make this cushion of an outer shoe 60, and an inner tube 61, the tubes being supplied with a valve 62 by means of which the inner tube may be inflated. The outer tube is removably secured to the plates 11 and the lower plates 35, 36 or 37 by means of removable rivets 63, 64, 65 and 66.

The rear axle 68 is mounted in a swinging thrust rod 69 in such a way as not to rotate with relation to the rod. Suitable means are provided for securing the rear axle to the thrust rod. In the embodiment of the invention illustrated upon the drawings, I have shown a connection 70 for this purpose. This is secured to the bracket 70ᵃ that is rigidly connected with the rear axle, the bracket carrying the plate 37. The thrust rod 69 is provided with the usual take-up device 71. The rear wheels 4 are free to rotate on the rear axle as usual. The back cushions 67 can be removed from the back of the machine, the back rods 51 and 52 being suitably spaced, so that the cushion 67 may easily be removed from between them. The rear rod 53 is provided with a bracket 57 between which and the plate 37 springs 58 and 59 are mounted to take up the shock.

The means for tilting the plate 11 by the bodily movement of the axle 68 and the means for preventing a lateral movement of the axle 68, with relation to the bed of the carriage, are like the means which accomplish this result for the front axle and plates, so that a repetition of the description of these parts will be unnecessary. The vehicle is driven by means of any suitable motor, such as a gas engine inclosed in the casing 72, which drives a sprocket wheel 73 on axle 74. A chain 75 communicates the movement of the sprocket wheel 73 to the rear sprocket 76, loosely mounted on the rear axle 68.

A suitable brake, which is shown as consisting of a hub 77, is secured to the rear wheel and is embraced by a braking hand 78, operated by the levers 79, connecting rod 80 and hand lever 81. The position of the brake is determined as usual by means of a rack 82, and detent 83 pressed into engagement with the rack by the spring 84. When the brake is applied, the vehicle is brought to rest with a quick smooth action without transmitting the shock of the sudden stoppage of the wheels to the body of the vehicle, much of the shock being absorbed through the action of the parts, including the pneumatic cushions on which the bed of the vehicle is supported.

With reference to the embodiment of my invention illustrated in Fig. 9, the plate 85 which corresponds to the plate 11, in Fig. 3, may be provided with a plurality of curved portions 86 which engage the upper part of the pneumatic cushion. The plate 87 is secured to the plate 85 and is provided with an aperture 88, by means of which the plate may be pivotally secured to the frame attached to the bed of the machine. The lower plate 89 is provided with corresponding projections 90 and is firmly secured to the axle 91. By these means the pneumatic cushion 92 is pressed upon at individual points instead of applying pressure throughout the surfaces of the cushion. Rods 93, 94 connect the top plate 85 with brackets 95, on which brackets are mounted springs 96 and 97, the upper end of these springs are received in sockets 98. Suitable springs 99, 100 are preferably provided having free ends 101 which will receive the weight of the vehicle should the pneumatic cushion 92 become deflated. Telescoping connections 102, supported by springs 103 and guided by pins 104, in slots 105, guide the upper ends of the springs 99, 100.

With reference to Fig. 10, I provide an upper plate 106, pivoted to the plate 106ᵃ which in turn is pivoted at 107 to the bed of the machine, the pivot passing through 107 being bodily movable, as above described, with relation to the other figures.

I also provide a pneumatic cushion 108 to take up the pressure between the plate 106 and the curved lower plate 109. The curved plate 109 is attached to the axle 110 by means of the arms 111, which connect it with the cross-piece 112, that is secured to the axle. Rods 113, 114, springs 115, 116, 117 and 118 are provided, these springs acting like those which have been heretofore described. Telescoping connections 119, cooperate with springs 117, 118 in the manner heretofore described. The upper plate 106 is connected to the plate 106ᵃ by a pivotal joint, such as a ball and socket joint 120, so as to prevent side tilting of the plate 106 with relation to the bed of the machine, should the wheel beneath the plate 106 enter a rut in the road.

The operation of my invention will be apparent from the foregoing description. Easy riding and the absorption of shocks between the road way and the bed of the carriage are secured in that when either the front or back wheels meet an obstruction, such as a stone or the like, the wheels are permitted to yield in the direction of the movement of the vehicle, the axles swinging bodily. The plates which embrace the pneumatic cushions between them and transmit the pressure from the bed to the axle, are kept in parallel position, and very little shock is transmitted to the bed of the vehicle.

The connections between the axle and bed are made much more flexible and yielding or elastic. The slight rotation of the axle upon its axis as it swings on radius rod 7, is not communicated to the bed of the vehicle, and the longitudinal movement due to the bodily swinging is reduced as it is communicated to the bed. The longitudinal movement of the upper support for the resilient means, also tends to reduce the shock transmitted to the bed. My improved connections between the wheel or axle and the bed enable pneumatic bags to be successfully employed as cushioning means for motors and other vehicles. While the supports for these may be widely varied, those shown in the drawing consisting of plates movable together as a unit, and with the axle, afford peculiar advantages in that the pressure on the pneumatic cushions is applied to the best advantage and always in the same way, the wear and tear on the pneumatic cushions is reduced to a minimum, and is always evenly distributed throughout the cushion.

Of course many changes, departures and modifications in the specific devices shown in the drawing, may be made without departing from my invention, the essentials of which are set forth in the claims.

By means of my improved devices I am enabled, in such heavy vehicles as automobiles, to dispense with the pneumatic tires ordinarily employed, and to rely upon pneumatic bags interposed between the axle and the bed. While such resilient means may be of any desired form, my devices lend themselves with particular value to the use of pneumatic cushions in such connection. In practice I have found that in the case of automobiles provided with my improved devices, an automobile will run as easily and smoothly over a rough road with solid tires, as the ordinary automobile today provided with pneumatic tires, thus avoiding the great expense, annoyance, loss of time and trouble now universally encountered in the employment of pneumatic tires. The cost of a pneumatic cushion employed as shown in my device, is very small, and the wear and tear upon it very little. I have found, moreover, that a very slight air pressure in such a cushion, thus used, is sufficient, and that such air pressure is very durable, with practically little or no leakage, thus saving much of the trouble and annoyance now encountered in blowing up pneumatic devices and decreasing the wear upon the same.

Having now fully described my invention, what I claim, and desire to secure by Letters Patent, is:

1. In a vehicle, the combination of a bed, an axle, two supports, one support carried by the axle and the other support secured to a supporting piece connected to the bed and movable longitudinally thereon, resilient means supported by the two supports and adapted to transmit the pressure of the weight of the bed from one support to the other, and connections between the two supports permitting vertical play between them but causing the upper support to move with the lower support rigidly in a longitudinal direction.

2. In a vehicle the combination of a bed, a pressure transmitting member pivotally mounted with relation to said bed, means for permitting a bodily longitudinal movement of the pivot with relation to said bed, an axle, a pair of wheels, and a pneumatic cushion arranged between said axle and said member, said cushion being adapted to absorb shock.

3. In a vehicle the combination of a bed, a pressure transmitting member movably mounted with relation to said bed and free to have a bodily longitudinal movement relatively thereto, a pair of wheels, an axle, means rigid with the axle for supporting a pneumatic cushion, connections between said means and the pressure transmitting member permitting motion of said means and member toward or away from each other but causing them to move together as a unit in all other directions and a pneumatic cushion supported by said member and said means, said cushion being adapted to absorb shock.

4. In a vehicle the combination of a pneumatic bag, two supports one resting upon the top of the bag and having a yielding connection with the bed and adapted to transmit weight from the bed to the bag and the other supporting the bag and rigidly connected with the wheel-carrying axle and adapted to transmit the weight to the wheel, and connections between the two supports independent of the pneumatic bag and rigid in all respects except as to movement of the supports toward and away from each other, the said supports, their connections and the pneumatic bag being so shaped and arranged as to leave the bag unconfined at its sides and free to expand and contract, whereby the bag supports may freely move toward or away from each other but will be compelled to move together rigidly as a unit in all other directions thereby maintaining their parallelism and relative location to each other except as to their distance apart.

5. In a vehicle, the combination of a bed, an axle, two supports, one carried by the axle and rigidly connected therewith and the other secured to a supporting piece connected with the bed so as to be movable longitudinally thereon, resilient means supported by the two supports and adapted to transmit the pressure of the weight of the bed from one support to the other, and connections between the two supports adapted to permit vertical play between the supports and causing the upper support to move in all other directions rigidly with the lower support.

6. In a vehicle, the combination of a bed, an axle, two supports, one carried by the axle and rigid therewith and the other pivoted to a supporting piece connected with the bed, a supporting piece for the said support movable longitudinally of the bed, a pneumatic cushion supported by the two supports and adapted to transmit the pressure of the weight of the bed from one support to the other, and connections between the two supports adapted to permit vertical movement between them but rigidly communicating any longitudinal movement of the lower support to the upper support.

7. In a vehicle, the combination of a bed, a plate, a pivot connecting said plate with said bed, means for permitting a bodily longitudinal movement of said pivot, a pair of wheels, an axle, a plate mounted above said axle and a pneumatic cushion between said plates, said cushion being adapted to absorb shock.

8. In a vehicle the combination of a bed, a plurality of plates pivotally connected with said bed, a pair of wheels, an axle, a plurality of pneumatic cushions one for each plate, each located between one of said plates and said axle, means for rigidly connecting said plates, and means secured to said connecting means for preventing lateral movement of said axle with relation to said bed.

9. In a vehicle the combination of a pneumatic bag, two supports one resting upon the top of the bag and having a yielding connection with the bed and adapted to transmit weight from the bed to the bag and the other rigid with the axle, supporting the bag and adapted to transmit weight to the axle, and connections between the two supports independent of the pneumatic bag and rigid in all respects except as to movement of the supports toward and away from each other, the said supports, their connections and the pneumatic bag being so shaped and arranged as to leave the bag unconfined at its sides and free to expand and contract, whereby the bag supports may freely move toward or away from each other but will be compelled to move together rigidly as a unit in all other directions thereby maintaining their parallelism and relative location to each other except as to their distance apart.

10. In a vehicle the combination of a bed, a plurality of plates pivotally connected with said bed, a pair of wheels, an axle, said axle being movably mounted with relation to said bed, connections between said axle and said bed, a plurality of pneumatic cushions one for each plate, each located between one of said plates and said axle, means connecting said plates, and means secured to said connecting means for preventing lateral movement of said axle with relation to said bed.

11. In a vehicle the combination of a pneumatic bag, two plates one resting upon the top of the bag and having a yielding connection with the bed and adapted to transmit weight from the bed to the bag and the other supporting the bag and rigidly connected with the wheel-carrying axle and adapted to transmit the weight to the wheel, and connections between the two plates independent of the pneumatic bag and rigid in all respects except as to the movement of the plates toward and away from each other, the said plates, their connections and the pneumatic bag being so shaped and arranged as to leave the bag unconfined at its sides and free to expand and contract, the said plates also being so shaped as not to cut or rupture the bag, whereby the plates may freely move toward or away from each other but will be compelled to move together rigidly as a unit in all other directions thereby maintaining their parallelism and relative location to each other except as to their distance apart.

12. In a vehicle the combination of a bed, a plate pivotally connected with said bed, a pair of wheels, an axle, a plate secured to said axle, a pneumatic cushion located between said plates and a spring between said axle and the plate connected with the bed, said spring being adapted to come into action after said pneumatic cushion has been compressed.

13. In a vehicle the combination of a bed, a plate pivotally connected with said bed, a pair of wheels, an axle, a plate secured to said axle, a pneumatic cushion located between said plates, a spring having a free end between said axle and one of said plates, said spring being adapted to come into action after said pneumatic cushion has been compressed, and guiding means for the free end of said spring.

14. In a vehicle the combination of a bed, a plate pivotally connected with said bed, a pair of wheels, an axle, a plate secured to said axle, a pneumatic cushion located between said plates, a spring having a free end between said axle and one of said plates, said spring being adapted to come into action after said pneumatic cushion has been compressed, and guiding means comprising a telescoping tube for the free end of said spring.

15. In a vehicle the combination of a bed, an upper plate pivotally secured thereto, a pair of wheels, an axle, a plate mounted above said axle, a pneumatic cushion between said plates, a plate mounted beneath the said axle, a compression spring between said lower plate and said axle, and connecting rods between said upper plate and said lower plate.

16. In a vehicle the combination of an axle, a bed, a resilient means interposed between the axle and the bed, two supports for the resilient means, one connected with the axle and the other connected with the bed, a connection between the axle and the upper support adapted to move that support laterally and longitudinally with the axle and to rock it with the rocking axial movement of the axle, but permitting vertical play between the upper support and the axle, and connections between the upper support and the bed permitting that support to rock and to move longitudinally relatively to the bed but compelling the two to move laterally with each other.

17. In a vehicle the combination of an axle, a bed, a resilient means interposed between the axle and the bed, two supports for the resilient means, one connected with the axle and the other connected with the bed, a connection between the axle and the upper support adapted to move that support laterally and longitudinally with the axle, but permitting vertical play between the upper support and the axle, and connections between the upper support and the bed permitting that support to move longitudinally relatively to the bed but compelling the two to move laterally with each other.

18. In a vehicle the combination of a pneumatic bag carried by the axle, a plate resting upon the top of the bag and having a yielding connection with the bed and adapted to transmit weight from the bed to the bag, and connections between the axle and the plate independent of the bag and rigid in all respects except to permit vertical movement between the plate and axle, said connections including a plurality of bearing surfaces permitting the said vertical play between the plate and axle but holding them rigid otherwise, the plate, bag and connections being so shaped and arranged as to leave the bag unconfined at its sides and free to expand and contract.

19. In a vehicle, the combination of a bed, an axle, a plate fixed on the axle and movable therewith, a plate pivoted to a support on the bed, a support on the bed for the pivot movable longitudinally on the bed, a pneumatic cushion carried between the plates and compressible between them, connections between the axle and the upper plate rigid in all directions except vertically adapted to permit vertical play between the axle and the upper plate but to communicate all other movements of the axle to said plate.

20. In a vehicle the combination of a wheel-carrying axle part, a bed, a pneumatic bag interposed between said axle part and the bed, two supports for the bag, one rigid with the said axle part and the other yieldingly connected with the bed, and a connection between the said axle part and the support connected with the bed permitting vertical play between the said support and the said axle part but causing the said support to move otherwise rigidly with the said axle part, the bag, its supports and connections being so shaped and arranged as to leave the bag unconfined and free to expand and contract.

21. In a vehicle, the combination of a bed, an axle, two plates for carrying a resilient means, one plate secured to the axle and the other plate secured to a supporting piece connected with the bed, a supporting piece for said plate connected with the bed so as to be movable longitudinally thereon, resilient means supported by the two plates, and connections between the axle and the plate connected with the bed permitting vertical movement between the axle and the plate but communicating any longitudinal movement of the axle to the said plate.

22. In a vehicle, the combination of a bed, an axle having a pivotal connection with the bed, two pressure-transmitting members, one at each side of the bed and each pivotally mounted with relation to the bed and having its pivotal point of support free to move longitudinally thereon, means connecting the said two pressure-transmitting members, a support for the connecting means carried by the axle permitting vertical movement of the said connecting means, pressure-transmitting members and bed relative to the axle but preventing lateral movement between them, two pressure-transmitting members carried by the axle and rigid therewith at opposite ends thereof, and a pneumatic cushion arranged between each of the pressure-transmitting members pivotally connected to the body and its corresponding pressure-transmitting member carried by the axle, all so arranged that the pressure-transmitting members of each set, between which a pneumatic cushion is carried, will always maintain a parallel position relative to each other, and so that the axle and the bed are free to move in all directions relative to each other except laterally.

23. In a vehicle the combination of a bed, a pressure transmitting member movably mounted with relation to said bed, a pair of wheels, a bodily movable axle, a pneumatic cushion arranged between said axle and said bed, an arm secured to said axle, and connections between said arm and said member, whereby the bodily movement of said axle moves said member.

24. In a vehicle the combination of a bed, a pressure transmitting member pivotally mounted with relation to said bed, a pair of wheels, a bodily movable axle, a pneumatic cushion to absorb shock between said axle and said bed, an arm secured to said axle, sliding connections between said arm and said member, whereby said axle and said member are enabled to move toward and from each other, and whereby a bodily movement of said axle moves said member.

25. In a vehicle the combination of a bed, an axle, a plate rigid with the axle, a plate connected with the bed so as to be rigid with it in reference to lateral movement but free to rock or to move longitudinally relatively to the bed, a pneumatic cushion supported by the two plates and adapted to transmit the pressure of the weight of the bed from one plate to the other, and connections between the axle and the upper plate permitting vertical play between the upper plate and the axle, but rigidly communicating to the upper plate any longitudinal motion of the axle relative to the bed and rigidly communicating any lateral motion of the axle to both upper plate and bed.

26. In a vehicle the combination of a bed, an axle, a plate rigid with the axle, a plate connected with the bed so as to be rigid with it in reference to lateral movement but free to rock or to move longitudinally relatively to the bed, a pneumatic cushion supported by the two plates and adapted to transmit the pressure of the weight of the bed from one plate to the other, and connections between the axle and the upper plate permitting vertical play between the upper plate and the axle, but rigidly communicating to the upper plate any longitudinal motion of the axle relative to the bed and also any rocking motion of the axle on its axis and rigidly communicating any lateral motion of the axle to both upper plate and bed.

27. In a vehicle the combination of resilient means, two supports for the same, one support secured to a supporting piece connected with the bed so as to be movable longitudinally thereon and the other support rigidly connected with the axle and adapted to move freely toward or away from each other in accordance with the varying pressure on the resilient means but connected so that they will move together rigidly as a unit in all other directions.

28. In a vehicle the combination of a pneumatic cushion, two supports for the same, one support secured to a supporting piece connected with the bed so as to be movable longitudinally thereon and the other support rigidly connected with the axle and adapted to move freely toward or away from each other in accordance with the varying pressure on the pneumatic cushion but connected so that they will move together rigidly as a unit in all other directions.

29. In a vehicle the combination of a pneumatic cushion, two supports for the same, one support secured to a supporting piece connected with the bed so as to be movable longitudinally thereon and the other connected with the axle, adapted to move freely toward or away from each other in accordance with the varying pressure on the pneumatic cushion but connected so that they will move together rigidly as a unit longitudinally of the vehicle.

30. In a vehicle the combination of a bed, an axle, a pneumatic cushion, two supports for the same, one support secured to a supporting piece connected with the bed and free to move longitudinally thereon, the other support rigidly connected to the axle, and connections between the axle, the two supports and the bed adapted to compel the bed, the two supports and the axle to move rigidly as a unit laterally but permitting the bed and axle freedom of motion relative to each other in all other directions, and permitting the two supports to move toward or away from each other freely in accordance with the varying pressure on the pneumatic cushion but compelling the two supports to move with the axle in all other directions rigidly as a unit.

31. The combination with a vehicle bed and its axle of an elongated pneumatic cushion upwardly curved or arched between its ends and extending longitudinally of said bed, means whereby said cushion is connected with the axle, a bearing member having an extended flat surface resting upon the cushion, and yielding connections between said bearing member and the vehicle bed.

32. The combination with a vehicle bed and its axle, of a segment like pneumatic cushion extending longitudinally of said bed, a curved support whereby the said cushion is connected with the axle transversely of the latter, a bearing member having an extended flat surface resting upon the cushion, and yielding connections between said bearing member and the vehicle bed.

33. The combination with a vehicle bed and its axle, of an elongated pneumatic cushion upwardly curved or arched between its ends and extending longitudinally of said bed, a support whereby the said cushion is mounted on the axle transversely thereof, said support permitting lateral and longitudinal distention of the cushion, a bearing member extending longitudinally of said bed and resting upon the cushion, and yielding connections between said bearing member and the vehicle bed.

In testimony whereof, I have signed my name to this specification, in the presence of two subscribing witnesses.

THEODORE A. KLENKE.

Witnesses:
HELEN B. YOUNKIN,
D. HAROLD BUSH.